Figure 1:
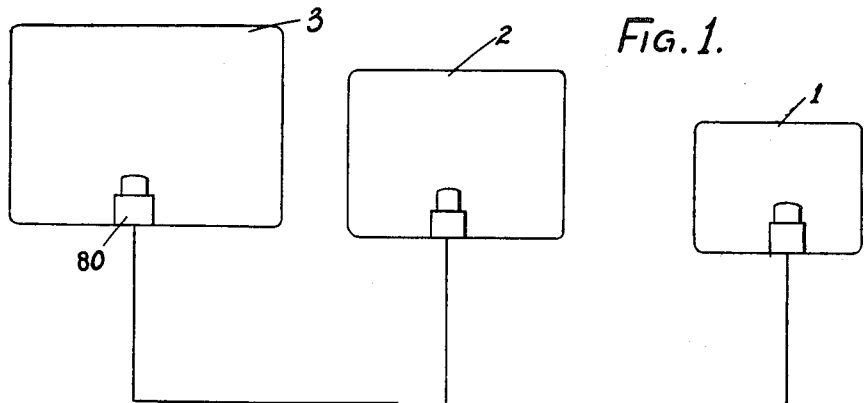

July 24, 1956  J. A. McKEAN  2,755,740
FLUID PROPORTIONERS
Filed Oct. 5, 1951  4 Sheets-Sheet 1

INVENTOR:
J. A. McKean
BY:
Watson, Cole, Grindle + Watson
ATTORNEY:

July 24, 1956 J. A. McKEAN 2,755,740
FLUID PROPORTIONERS
Filed Oct. 5, 1951 4 Sheets-Sheet 2

INVENTOR:
J. A. McKean
BY:
Watson, Cole, Grindle & Watson
ATTORNEY:

July 24, 1956   J. A. McKEAN   2,755,740
FLUID PROPORTIONERS
Filed Oct. 5, 1951   4 Sheets-Sheet 3
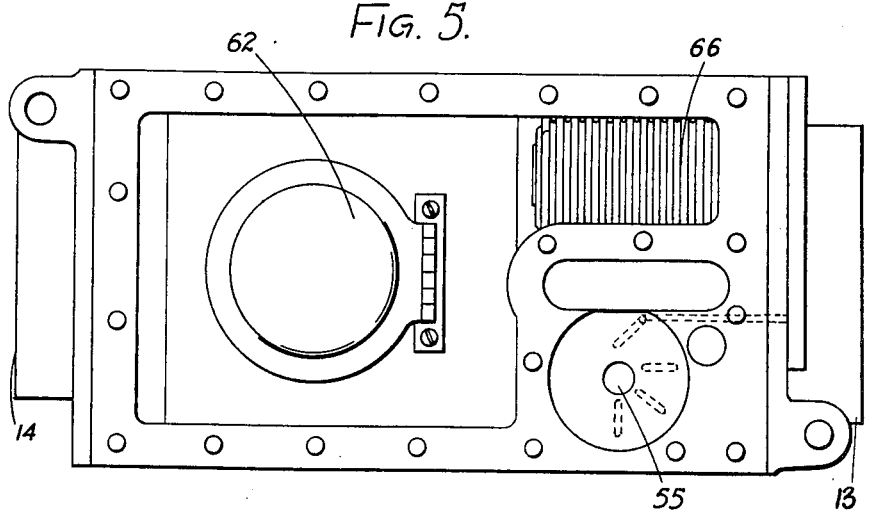
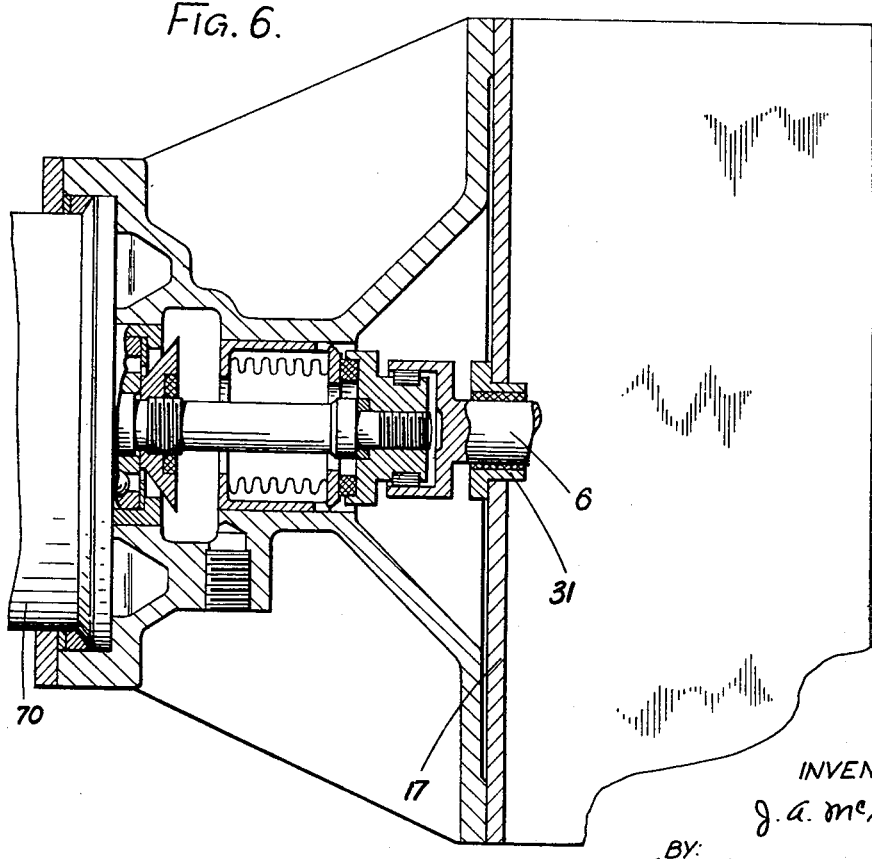
INVENTOR:
J. A. McKean
BY:
Watson, Cole, Grindle & Watson
ATTORNEY:

July 24, 1956  J. A. McKEAN  2,755,740
FLUID PROPORTIONERS
Filed Oct. 5, 1951 4 Sheets-Sheet 4

INVENTOR:
J. A. McKean
BY:
Watson, Cole, Grindle & Watson
ATTORNEY:

United States Patent Office 2,755,740
Patented July 24, 1956

2,755,740

FLUID PROPORTIONERS

James Alston McKean, Slough, England, assignor to Bernard Bercovitz, Leaside, Ontario, Canada Application October 5, 1951, Serial No. 249,851

Claims priority, application Great Britain October 5, 1950

8 Claims. (Cl. 103—11)

The invention relates to fluid proportioners.

It is frequently desired that two or more fluids, more usually liquids, shall flow at volumetric rates which bear a definite proportion or definite proportions to one another. Further it may be desired that the rates, while maintaining the same proportion or proportions may vary over wide ranges. For example in an aircraft fuel system in which fuel is carried in several tanks of different capacities it may be desired that the flow from all the tanks shall be maintained at such relative rates, even although the total consumption rate may vary, that the same proportion of the contents of each tank is withdrawn and the tanks all become empty at about the same time, an object of such an arrangement being to control changes in the position of the centre of gravity of the fuel system as a whole. Again it is a common requirement that two liquids which are to be mixed shall flow into a mixing chamber at the definite proportions required for the mixture. Another requirement may be that two or more liquids shall flow proportionately without mixing. An object of the present invention is to provide a simple, effective and reliable fluid proportioner which meets the above requirements individually or collectively.

Flow controlling devices are known which consist of a hollow stator having an internal curved surface, a rotor within the stator and relatively rotatable thereto, the rotor being positioned in relation to the curved surface to leave a space between them over a part of the circumference of the rotor, the space being sealed at its ends in the circumferential direction and in the axial direction, inlet and outlet openings to the space and radially slidable vanes in the rotor arranged to sweep out the said space between the inlet and outlet on relative rotation of the rotor and stator. Such sliding vane flow controlling devices are sometimes positively driven and operate as pumps and sometimes are driven by the flow of the fluid in which case they may be employed as meters or motors.

The present invention provides a fluid proportioner comprising two or more sliding vane flow controlling devices as described above of which the rotors are mounted for rotation in unison, the controlling devices being arranged for allocation respectively to the several fluids to be proportioned, and having a ratio or ratios of throughput corresponding to the fluid proportions desired.

Preferably the throughput of at least one of the devices is adjustable independently of the throughput of the other device or devices. Conveniently each such device is so adjustable.

In one construction the adjustment may be effected by relative radial movement of the stator or rotor thereby to change the volume of the aforesaid space. The adjustment may permit the rotor to be brought into contact with, or closely adjacent to, the curved surfaces of the stator thereby to cut off the flow. The stator may be of oval section internally (i. e. have an internal cross-section of a shape bounded by two opposed semi-circles joined at their ends by straight lines) and the rotor may be of cylindrical form having a radius substantially the same as that of the aforesaid semi-circles so that the rotor makes sealing engagement with the straight sides thereby to provide the seal aforesaid of the circumferential ends of the space. With this arrangement the rotor may be adjustable as aforesaid so that it interfits with one semi-circular end and thereby reduces the aforesaid space to zero.

To enable the above adjustment to be effected each stator may be supported in a housing provided with guide means for constraining the stator to move in the radial direction of the rotor and means for effecting the adjustment and for holding the stator in its adjusted position may be provided in the housing. Further, additional means may be provided whereby the stator may be moved to the cut-off position independently of the adjustment. The housing may also provide inlet and outlet conduits leading to the stator inlet and outlet respectively.

The proportioning devices may be provided with a driving motor (e. g. electrically operated) whereby the rotor shaft may be positively driven. The driving connection between the motor and the rotor shaft may include a free-wheel to allow the rotor shaft to overrun the motor when rotated by the fluid.

There may be provided for each flow controller a by-pass valve whereby fluid may be drawn past the controller should it fail to rotate. In one construction in which a by-pass valve is employed the valve is normally held in the closed position against the fluid inlet pressure by pressure (e. g. acting on a diaphragm) derived from a pump (e. g. a booster pump) driven from the rotor shaft whereby if the rotor shaft fails to rotate the holding pressure is lost and the valve permitted to open, for example under the action of a spring.

Figure 2:
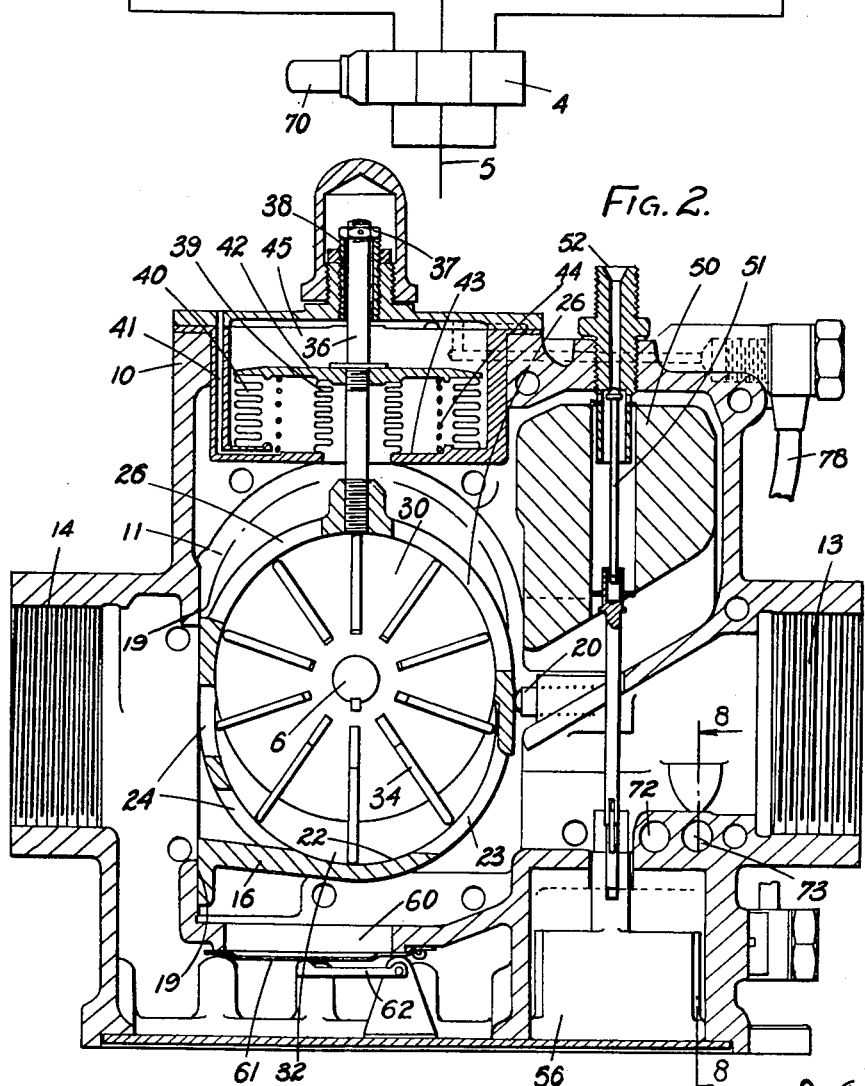
Figure 3:
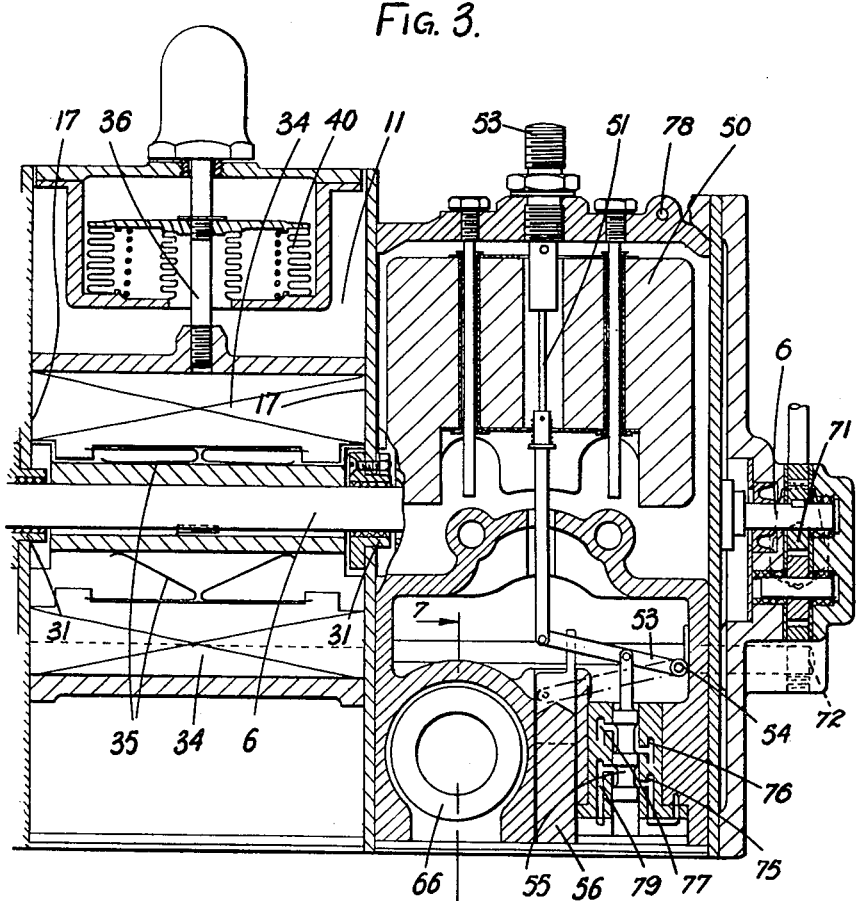
Figure 4:
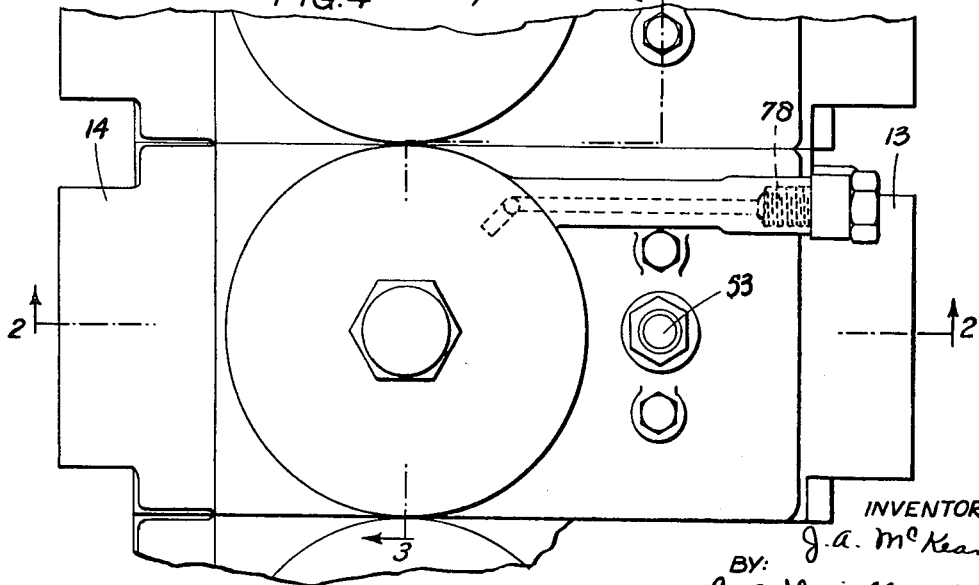
Figure 7:
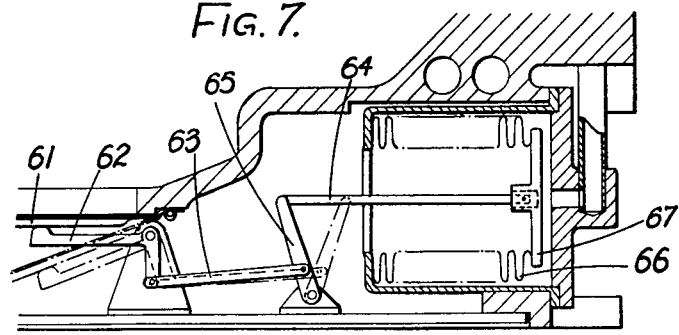
Figure 8:
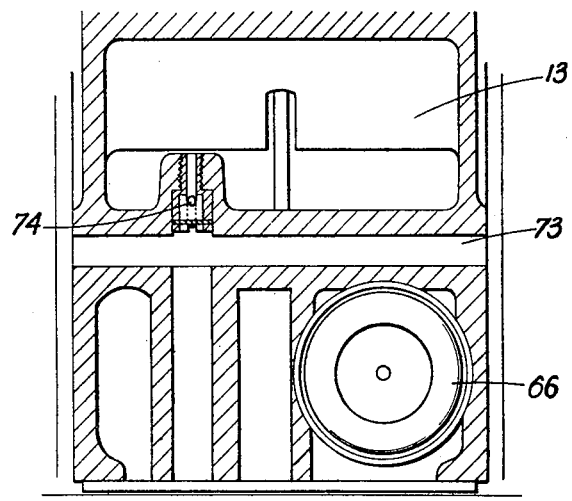
Figure 9:
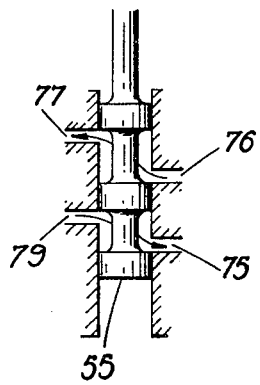
Figure 10:
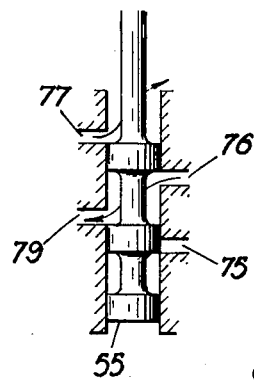

A specific application of the invention to an aircraft fuel system will now be described by way of example, and with reference to the drawings in which:

Figure 1 is a diagram illustrating a part of the fuel system,

Figure 2 is a section through one of the flow controlling devices, taken along line 2—2 of Figure 4, Figure 3 is a section through two of the controlling devices, taken generally along line 3—3 of Figure 4, Figure 4 is a plan view of three of the controlling devices of the present invention in juxtaposed relationship, Figure 5 is an under plan of one of the controlling devices of the present invention with the bottom cover and some of the internal parts omitted, Figure 6 shows, partly in section, the arrangement at one end of the proportioner, Figure 7 is a sectional view on the line VII—VII in Figure 3 showing details of the construction, Figure 8 is a section on the line VIII—VIII in Figure 2, and Figures 9 and 10 are enlarged views of a valve and associated ports employed in the devices.

In this example each wing of the aircraft has three fuel tanks 1, 2, 3 of different capacities and each wing is provided with a liquid proportioner 4 arranged to control the rates of flow from the several tanks in proportion to the capacities of the tanks. Each proportioner has a single outlet 5 and the outlets from the two proportioners lead to a further proportioner controlling the rates of flow from the two wings respectively. This second proportioner, which is not shown, is however an optional addition.

Each of the two wing proportioners comprises three sliding vane flow controlling devices allocated to the three tanks in the wing respectively. The rotors of the three devices are carried on a common shaft 6 for rotation in unison. The three devices are of similar construction, size and arrangement and, for the sake of simplicity, the following description relates to only one of them.

The flow controlling device comprises a housing 10 having a throughway of which the central portion 11 is of generally rectangular section. One end 13 of the throughway constitutes an inlet conduit and is connected to the associated fuel tank. The other end 14 of the throughway constitutes an outlet conduit and is connected to the pipe line 5 common to all the three devices leading to the central proportioner. The stator 16 of the device is provided within the central portion 11 of the throughway. The stator is of tubular form with its axis extending transversely, in a horizontal plane, to the axis of the throughway. The ends of the stator make fluid-tight contact with the side walls 17 of the throughway. The stator is held against surfaces 19 on the stator by a spring plunger 20 which provides a seal preventing flow of fuel around the outside of the stator and also guides the stator for vertical movement. Internally the stator is of oval cross-section as defined above and as shown at 22. Inlet and outlet ports 23 and 24 respectively are provided through the walls of the stator in the lower half thereof, the ports communicating respectively with the inlet and outlet conduits of the housing. Pressure relief ports 26 are also provided in the upper part of the stator communicating with the inlet conduit but not with the outlet conduit.

The rotor 30 is of cylindrical form and has a diameter equal to that of the semi-circular ends of the stator bore. The shaft 6 carrying the rotor extends through bearings 31 in the side walls 17 of the housing and supports the rotor in a position such that when the stator is at the lower end of its vertical movement in the housing (as shown in full lines) the upper semicircular surface of the stator makes contact with the rotor and there is a space 32 between the lower semicircular surface of the stator and the lower part of the rotor. The rotor is provided with ten radial blades 34 extending the full length of the rotor and slidable in radial slots. Leaf springs 35 within the slots urge the blades outwardly into contact with the internal surface of the stator. Consequently as the rotor rotates the blades sweep out the space between the rotor and the lower part of the stator thereby transferring fuel from the inlet port to the outlet port. Extending upwardly from the top of the stator there is a rod 36 and at the upper end of the rod there is a nut 37 which seats on an adjustable ferrule 38 screwed into the housing. This arrangement provides for adjustment of the volume of the space 32 by variation in the lower limit of movement of the stator and hence of the amount of fuel passed during each revolution of the rotor.

At the top of the housing there is a flexible capsule comprising inner and outer flexible bellows 39, 40. The annular space within the capsule between the bellows is in communication with the atmosphere through a passageway 41. The upper surface 42 of the capsule is secured to the rod 36 and the lower surface 43 is formed by a part of the housing. A spring 44 within the capsule urges the surface 42 and with it the stator upwardly or the resilience of the bellows may be sufficient for the purpose. Fluid pressure applied to the chamber 45 in a manner later described, acts upon the capsule to urge the stator downwardly to the limit of its permitted movement.

On the inlet side of the device there is a chamber containing a float 50 controlling a spindle 51 which at its upper end serves as a bleed valve for air from the housing, the bleed connection 52 leading back to the fuel tank, and at its lower end is coupled to a lever 53 pivoted at 54 and operating a piston valve 55. The lever 53 also passes between the arms of a fork on the upper end of a weight 56 free to slide vertically in the housing.

Underneath the stator there is a by-pass 60 between the inlet and the outlet, the by-pass being controlled by a flap valve 61 which is lightly urged by a spring upwardly to the closed position. There is also a lever 62 connected by links 63, 64 and lever 65 to a bellows 66, the arrangement being that fluid pressure applied in the bellows chamber 67 rocks the lever 62 upwardly to hold the valve 61 closed.

At one end of the shaft 6 there is an electric driving motor 70 and at the other end of the shaft there is a small gear pump 71 connected to a supply of fuel and delivering into a throughway 72 common to all the housings.

A further throughway 73 is common to all the housings and has connections to each of the inlets 13 through non-return valves 74.

The throughway 72 is connected to a port 75 in the housing of each valve 55 and the throughway 73 is connected to a port 76 in the housing of each valve. A port 77 in each housing leads through pipe connections 78 to the associated bellows 45 and a port 79 leads to the associated bellows 66.

The operation of the proportioner is as follows. Each of the fuel tanks is provided with an electrically driven booster pump. When all the booster pumps are running and the aircraft engine is consuming fuel, the fuel flows through the several flow controlling devices thereby causing rotation of the rotors by action of the fuel on the vanes. The motor 70 may be employed to assist in the rotation of the rotors and also in the starting of the device. The rotors, all being on the same shaft, rotate at the same speed and the proportion of the total fuel flowing which may be withdrawn from any particular tank is determined by the dimensions of the space between the rotor and stator. This space is adjusted (e. g. as the result of an initial calibration test) by means of the ferrule 38 as described above.

If, for any reason, one of the booster pumps should fail then the proportioner will continue to operate, the rotors being driven by the fuel from the other pumps, or by the motor 70 and fuel will be drawn from the tank of which the booster pump is inoperative by the pumping action of the proportioner. If all the booster pumps should fail and the rotor stop then the by-pass valves may open and fuel be drawn through the by-passes by the engine pump as later described.

In the normal operation of the proportioner fuel pressure is maintained in the throughway 73 through the valves 74 from the inlets 13, the pressure in the throughway being that of the inlet with the highest pressure. The pressure from the throughway 73 is transmitted to the flexible bellows 39, 40 which, under the action of this pressure, hold the stators at the lower limits of their movement. If the fuel supply to any one of the devices should cease (e. g. due to exhaustion of the tank or loss of fuel resulting from damage to the tank) the float 50 associated with that device will fall and the valve 55 move from the position shown in Figure 9 to that shown in Figure 10. The effect of this is to shut off the pressure from the bellows 39, 40 and to allow the bellows to expand and the stator to rise to its upper limit thereby closing the throughway through the device and ensuring that air is not drawn through the device into the fuel system. The fuel pressure from the bellows is released through the port 77 into the inlet 13. The by-pass valve 61 remains closed.

So long as the shaft 6 carrying the rotors is rotating the pump 71 maintains pressure in the throughway 72 and in the normal operation of the proportioner this pressure is transmitted through the valve 55 into the bellows 66 of each of the devices, the valves being in the position shown in Figure 9. Under these conditions the bellows 66 operate the levers 62 to hold the by-pass valves 61 closed. As already explained, if any one of the floats 50 falls pressure is maintained in the associated bellows 66 from the throughway 73 and the by-pass valve remains closed. If, however, the pressure in the throughway 72 fails (e. g. due to jamming of the rotors) while there is fuel available the pressure will be released from the bellows 66 and the by-pass valves 61 will open so that fuel may be passed around the rotors, the rate of flow of such fuel being uncontrolled.

If the aircraft should fly in an inverted position the weight 56 falls into engagement with the lever 53 and holds the float against movement due to the inversion of the machine. The proportioner will then continue to operate with fuel supplied, for example, from recuperators or from the main tanks by means of suitable valves employed to ensure continued supply when the machine is inverted.

I claim:

1. A fluid proportioner comprising at least two fluid-flow controlling devices each having a rotor equipped with radially slidable vanes and a stator having a cavity bounded by walls swept by said vanes and having inlet and outlet orifices at opposite ends of said cavity, the stator of at least one of the said controlling devices being mounted for movement relative to the rotor transverse to the axis thereof, so that the net throughput of fluid per revolution of the rotor is changeable to and from zero, a connection between said rotors constraining them to speeds of rotation that are fixedly proportional to one another, biassing means acting upon said relatively movable stator and urging it towards the position in which the net through-put of the fluid-flow controlling device is zero, and float-controlled means having a connection for fluid to said inlet orifice and an operative connection to said relatively movable stator, which means are responsive to the presence of fluid at said inlet orifice for normally constraining said stator against said biasing means to a position in which the net through-put is of predetermined value.

2. A fluid proportioner according to claim 1 in which said float controlled means comprises a chamber having a bleed orifice and a fluid inlet and fluid outlet, a two-way valve connected to and controlling said inlet and outlet for alternatively admitting fluid under pressure to said chamber and permitting escape of fluid therefrom, a chamber connected with the inlet orifice of said relatively movable stator and adapted to contain fluid, and a float housed within said second-mentioned chamber and so operatively connected to said two-way valve as to cause it to permit release of fluid under pressure from the first-mentioned chamber when the float is unsupported by fluid in the second-mentioned chamber.

3. A fluid proportioner according to claim 1 in which said float-controlled means comprises a chamber having a bleed orifice, a duct common to all said fluid-flow controlling devices and connected with the several inlet orifices thereof, non-return valves respectively interposed in the several connections of the said duct to the said inlet orifices so that the fluid pressure maintained in the duct is equal to the highest of the fluid pressures at said inlet orifices, a two-way valve connected between said duct and said chamber and normally admitting fluid under pressure from said duct to said chamber and alternatively permitting the escape of fluid therefrom, a chamber connected with the inlet orifice of said relatively movable stator and adapted to contain fluid, and a float housed within said second-mentioned chamber and so operatively connected to said two-way valve as to cause it to permit release of fluid under pressure from the first-mentioned chamber when the float is unsupported by fluid in the second-mentioned chamber.

4. A fluid proportioner comprising at least two fluid-flow controlling devices each having a rotor equipped with radially slidable vanes and a stator having a cavity bounded by walls swept by said vanes and having inlet and outlet orifices at opposite ends of said cavity, the stator of at least one of said controlling devices being mounted for movement relative to the rotor transverse to the axis thereof so that the net through-put of fluid per revolution of the rotor is changeable to and from zero, a connection between said rotors constraining them to speeds of rotation that are fixedly proportional to one another, biassing means acting upon said relatively movable stator and urging it towards the position in which the net through-put of the fluid-flow controlling device is zero, float-controlled means having a connection for fluid to said inlet orifice and an operative connection to said relatively movable stator, which means are responsive to presence of fluid at said inlet orifice for normally constraining said stator against said biassing means to the position in which the net through-put is of predetermined value, and means operatively associated with said float-controlled means and effective upon inversion of the fluid proportioner in the absence of fluid to preclude release of said stator by the said float-controlled means.

5. A fluid proportioner according to claim 4 wherein the means effective upon inversion of the proportioner comprises means responsive to gravity and operatively associated with said float-controlled means to prevent movement of said float-controlled means upon inversion of the proportioner and thereby maintain normal constraint of said relatively movable stator against said biasing means.

6. A fluid proportioner comprising at least two fluid-flow controlling devices each having a rotor equipped with radially slidable vanes and a stator having a cavity bounded by walls swept by said vanes and having inlet and outlet orifices at opposite ends of said cavity, the stator of at least one of said controlling devices being mounted for movement relative to the rotor transverse to the axis thereof so that the net through-put of fluid per revolution of the rotor is changeable to and from zero, a connection between said rotors constraining them to speeds of rotation that are fixedly proportional to one another, biassing means acting upon said relatively movable stator and urging it towards the position in which the net through-put of the fluid-flow controlling device is zero, pressure-responsive means also acting upon said relatively movable stator in opposition to said biassing means so as, when subjected to pressure, to move the stator to a position in which the net through-put of the fluid-flow controlling device has a predetermined value, said pressure-responsive means comprising a chamber having a bleed orifice, a duct common to all said fluid-flow controlling devices and connected with the said inlet orifices thereof, non-return valves respectively interposed in the several connections of the said duct to the inlet orifices so that the fluid pressure maintained in the duct is equal to the highest of the fluid pressures at the said inlet orifices, a two-way valve normally admitting fluid under pressure from said duct to said chamber and alternatively permitting the escape of fluid therefrom, a chamber connected with the inlet orifice of said relatively movable stator and adapted to contain fluid, a float housed within said second-mentioned chamber and so operatively connected to said two-way valve as to cause it to permit release of fluid under pressure from the first-mentioned chamber when the float is unsupported by fluid in the second-mentioned chamber, and a weight that is movable vertically within the proportioner (in the normal erect attitude of the latter) and that, when moved to an extreme position by inversion of the proportioner, inhibits such operation of said two-way valve by said float as to cause the two-way valve to permit release of fluid under pressure from the first-mentioned chamber when the float is unsupported by fluid in the second-mentioned chamber.

7. A fluid proportioner comprising at least two sliding vane fluid flow controlling devices each having a rotor and a stator equipped with a fluid inlet orifice and a fluid outlet orifice and mounted for movement towards and away from the axis of rotation of said rotor for changing the volume of the working chamber to and from zero, a connection between said rotors constraining them to speeds of rotation that are fixedly proportional to one another, a chamber connected with the inlet orifice of each said stator, a float housed within each said second-mentioned chamber, and means connected to each of said stators and controlled by each of said floats for moving as associated stator, said means being effective for changing the volume of said working chamber away from zero when said float is moved upwards by the presence of fluid in the second-mentioned chamber and for changing said volume to zero when said float moves downwards due to the absence of fluid in the second-mentioned chamber.

8. A fluid proportioner comprising at least two fluid-flow controlling devices each having a rotor equipped with radially slidable vanes and a stator having a cavity bounded by walls swept by said vanes and having inlet and outlet orifices at opposite ends of said cavity, the stator of at least one of the said controlling devices being mounted for movement relative to the rotor transverse to the axis thereof so that the net through-put of fluid per revolution of the rotor is changeable to and from zero, a connection between said rotors constraining them to speeds of rotation that are fixedly proportional to one another, a by-pass passage interconnecting the inlet and outlet orifices of each of said stators, a valve biased to a normally closed state in said by-pass passage, means for maintaining said by-pass valve normally closed, a pump operatively connected with said rotors to be driven thereby and adapted, when rotated thereby, to deliver fluid under pressure, pressure-responsive means acting upon said by-pass valve so as only when not subjected to pressure to permit the opening thereof, two-way valve means interconnecting said pump and said pressure-responsive means and adapted normally to admit pressure from said pump to said pressure-responsive means and alternatively to relieve the latter of pressure, a chamber connected with the inlet orifice of said relatively movable stator and adapted to contain fluid, a float housed within said chamber and so operatively connected with said two-way valve means as, when unsupported by fluid in the chamber, so to actuate the valve means as to relieve the pressure from the pressure-responsive means.

References Cited in the file of this patent
UNITED STATES PATENTS

| | | |
|---|---|---|
| 1,367,460 | Caudron | Feb. 1, 1921 |
| 1,670,229 | Balsiger | May 15, 1928 |
| 2,064,421 | Erskine | Dec. 15, 1936 |
| 2,225,803 | Smith | Dec. 24, 1940 |
| 2,238,062 | Kendrick | Apr. 15, 1941 |
| 2,291,424 | Wicorek | July 28, 1942 |
| 2,291,578 | Johnson | July 28, 1942 |
| 2,296,876 | Samiran et al. | Sept. 29, 1942 |
| 2,318,292 | Chandler | May 4, 1943 |
| 2,386,219 | Lauck | Oct. 9, 1945 |
| 2,387,761 | Kendrick | Oct. 30, 1945 |
| 2,412,588 | Lauck | Dec. 17, 1946 |
| 2,420,155 | Tucker | May 6, 1947 |
| 2,519,968 | Jordan | Aug. 22, 1950 |
| 2,564,306 | Isreeli et al. | Aug. 14, 1951 |
| 2,567,997 | Granberg | Sept. 18, 1951 |